US007651967B2

(12) United States Patent  
Kang

(10) Patent No.: US 7,651,967 B2  
(45) Date of Patent: Jan. 26, 2010

(54) SOLID-SOLUTION POWDER, METHOD TO PREPARE THE SOLID-SOLUTION POWDER, CERMET POWDER INCLUDING THE SOLID-SOLUTION POWDER, METHOD TO PREPARE THE CERMET POWDER, CERMET USING THE CERMET POWDER AND METHOD TO PREPARE THE CERMET

(75) Inventor: Shinhoo Kang, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 622 days.

(21) Appl. No.: 10/968,116

(22) Filed: Oct. 20, 2004

(65) Prior Publication Data

US 2005/0180875 A1 Aug. 18, 2005  
US 2006/0216192 A9 Sep. 28, 2006

(30) Foreign Application Priority Data

Feb. 14, 2004 (KR) ...................... 10-2004-0009859

(51) Int. Cl.
*C04B 35/56* (2006.01)
*C04B 35/58* (2006.01)

(52) U.S. Cl. ....................................... 501/87; 501/96.1

(58) Field of Classification Search ................. 423/440, 423/364; 75/236, 242; 501/87, 91.6
See application file for complete search history.

(56) References Cited

U.S. PATENT DOCUMENTS

| | | | | |
|---|---|---|---|---|
| 2,491,410 | A * | 12/1949 | Laughlin et al. | ............... 501/87 |
| 3,013,875 | A * | 12/1961 | Trifleman | ................... 419/15 |
| 3,488,291 | A * | 1/1970 | Hardy et al. | ................. 252/642 |
| 3,914,113 | A * | 10/1975 | Chiu | ........................ 428/539.5 |
| 4,008,090 | A * | 2/1977 | Miyake et al. | ................ 501/91 |
| 5,147,831 | A * | 9/1992 | Zeiringer | ................... 501/96.1 |
| 5,380,688 | A * | 1/1995 | Dunmead et al. | ............. 501/87 |
| 5,756,410 | A * | 5/1998 | Dunmead et al. | .......... 501/96.1 |
| 6,007,598 | A * | 12/1999 | Dunmead et al. | ............. 75/236 |
| 6,214,309 | B1 | 4/2001 | Shaw et al. | |
| 6,793,875 | B1 * | 9/2004 | Shaw et al. | ................... 419/18 |

FOREIGN PATENT DOCUMENTS

CN 98110950.0 1/2000  
JP 58-213842 A 12/1983

OTHER PUBLICATIONS

Ahn S., et al., "Effect of various carbides on the dissolution behavior of Ti($C_{0.7}N_{0.3}$) in a Ti($C_{0.7}N_{0.3}$)-30Ni system", International Journal of Refractory Metals & Hard Materials, (2001), vol. 19, pp. 539-545.
Ahn S. et al., "Formation of Core/Rim Structures in Ti(C,N)-WC-Ni Cermets via a Dissolution and Precipitation Process", J. Am. Ceram. Soc., (2000), vol. 83, No. 6, pp. 1489-1494.
Ahn S. et al., "Microstructure of Ti(CN)-WC-NbC-Ni Cermets", J. Am. Ceram. Soc., (2001), vol. 84, No. 4, pp. 843-849.
An H. et al., "Effect of $Y^{3+}$addition on the emitting level in a $SrTiO_3$:$Pr^{3+}$phosphor", Journal of Materials Science: Materials in Electronics, (2001), vol. 12, pp. 157-159.
Joardar J. et al., "Effect of nanocrystalline binder on the microstructure and mechanical properties of ultrafine Ti(CN) cermets", Materials Science and Engineering, (2003), vol. A360, pp. 385-389.
Jeon E.T. et al., "Microstructure and tribo-mechanical properties of ultrafine Ti(CN) cermets", International Journal of Refractory Metals & Hard Materials, (2002), vol. 20, pp. 207-211.
Jung I. et al., "A study of the characteristics of Ti(CN) solid solutions", Journal of Materials Science, (2000), vol. 35, pp. 87-90.
Jung I. et al., "A study of the formation of Ti(CN) Solid Solutions", Acta. Mater., (1999), vol. 47, No. 11, pp. 3241-3245.
Jung J. et al., "Effect of ultra-fine powders on the microstructure of Ti(CN)-xWC-Ni cermets", Acta Materialia, (2004), vol. 52, pp. 1379-1386.
Jung J. et al., "Microstructure of TiC-TiN-Ni-(b) cermet systems", Powder Metallurgy, (2002), vol. 45, No. 1, pp. 83-89.
Jung J. et al., "Synthesis of ultrafine $TiC_{1-x}$ and Ti(CN) powders via planetary milling". Powder Metallurgy, (2004), vol. 47., No. 1, pp. 93-98.
Kim S. et al., "Rim Structure in Ti($C_{0.7}N_{0.3}$)-WC-Ni Cermets", J. Am. Ceram. Soc., (2003), vol. 86, No. 10, pp. 1761-1766.
Koc R. et al., "Carbothermal synthesis of titanium carbide using ultrafine titania powders", Journal of Materials Science, (1997), vol. 32, pp. 3101-3111.
Koc R., "Kinetics and phase evolution during carbothermal synthesis of titanium carbide from ultrafine titania/carbon mixture", Journal of Materials Science, (1998), vol. 33, pp. 1049-1055.
Kwon W. et al., International Journal of Machine Tools & Manufacture, (2004), vol. 44, pp. 341-346.
Lee G. et at., "Processing Issues for Cryomilled WC-Co Nanopowders", Materials Transactions, (2003), vol. 44, No. 10, pp. 1-7.
Lee G. et al., "Synthesis of Nano-Sized WC-Co Powders by Reduction-Carburization Process", Materials Transactions, (2001), vol. 42, No. 8, pp. 1575-1581.
Mun S. et al., "Effect of HfC addition on microstructure of Ti(CN)-Ni cermet system", Powder Metallurgy, (1999), vol. 42, No. 3, pp. 251-256.
Park D. et al., "Effect of Carbides on the Microstructure and Properties of Ti(C,N)-Based Ceramics", J. Am. Ceram. Soc., (1999), vol. 82, No. 11, pp. 3150-3154.
Park Y.J. et al., "The formation of a solid solution band at the surface of Ti(CN)-based cermets", Materials Science and Engineering, (2000), vol. A291, pp. 198-206.
Seo O. et al., "Growth Inhibition of Nano WC particles in WC-Co Alloys during Liquid-Phase Sintering", Materials Transactions, (2003), vol. 44, No. 11, pp. 2339-2345.

* cited by examiner

*Primary Examiner*—Roy King  
*Assistant Examiner*—Ngoclan T Mai  
(74) *Attorney, Agent, or Firm*—Browdy and Neimark, PLLC

(57) ABSTRACT

Disclosed are a solid-solution powder, a method for preparing the solid-solution powder, a cermet powder including the solid-solution powder, a method for preparing the cermet powder, a cermet using the cermet powder and a method to prepare the cermet. According to the present invention, the problem of low toughness due to high hardness that conventional cermets (especially TiC or Ti(CN) based cermet) have is resolved because a complete solid-solution phase without core/rim structure is provided to the cermets as a microstructure thereof, and in which further increased the hardness as well as the toughness, thereby substantially and considerably increasing general mechanical properties of materials using the cermet, and thus substituting WC—Co Hard material and allowing manufacturing of cutting tools with high hardness and toughness.

22 Claims, 6 Drawing Sheets

SOLID-SOLUTION POWDER, METHOD TO PREPARE THE SOLID-SOLUTION POWDER, CERMET POWDER INCLUDING THE SOLID-SOLUTION POWDER, METHOD TO PREPARE THE CERMET POWDER, CERMET USING THE CERMET POWDER AND METHOD TO PREPARE THE CERMET

BACKGROUND OF THE INVENTION

1. Field of the Invention

The present invention relates to a solid-solution powder, a method for preparing the solid-solution powder, a cermet powder including the solid-solution powder, a method for preparing the cermet powder, a cermet using the cermet powder and a method to prepare the cermet, which are adapted to materials for high-speed cutting tools and die used in a machine industry such as manufacture of machine, an automotive industry and so on, in order to improve general mechanical properties, particularly toughness and hardness for the materials.

2. Description of the Related Art

For major cutting tools or wear-resistance tools utilized in metal cutting required for a machine industry, WC based hard alloys, various TiC or Ti(CN) based cermet alloys and other ceramic or high-speed steels, etc. are used.

A cermet means ceramic metal composite sinter. Usually, the cermet includes hard phase of TiC and Ti(CN) and binding phase of metal such as Ni, Co, Fe, etc., and an additive such as carbide, nitrite, carbo-nitrite, etc. of IVa, Va and VIa Group metals of the periodic table.

That is, usually, a cermet is prepared by mixing hard ceramic powders of WC, NbC, TaC, $Mo_2C$, etc., in addition to TiC or Ti(CN), with metal powders of Co, Ni, etc., which is matrix phase for binding the ceramic powders, and sintering the mixture under a vacuum or hydrogen atmosphere.

Titanium carbide and titanium carbo-nitrite are excellent hard materials with broad applications. As titanium carbide has a high hardness (Vicker's=3200 $kg/mm^2$), high melting points (3260° C.), high chemical and thermal stability, high wear-resistance and high solvency for other carbides, it has been used for high-speed cutting tools in substitution of WC—Co Alloy. However, in the TiC—Ni cermet system, coarsening of TiC grains results in poor mechanical properties. Further, in case of preparing a cermet using TiC, upon sintered, binding phase metal of Ni is used as a liquid metal, so that a wetting angle comes to be large in comparison with that of a combination of WC—Co And rapid grain growth of TiC comes to occur, which cause the problem of reducing a toughness of the cermet.

Nevertheless, in 1956, Ford Motor Company mass-fabricated TiC—$Mo_2C$—Ni cermet. Although the toughness of the cermet was not largely improved, the cermet had been used in semi-finishing and finishing as material for high hardness tools for precise machining operations.

In the 1960's and 1970's, to improve the toughness that was a great weakness of the TiC—Ni cermet system, there had been an attempt to add various kinds of elements thereto, which, however, could not have attained tangible results.

On the way, in the 1970's, performed was adding TiN to TiC in order to form Ti(C,N) of a more stable thermodynamic phase, which could improve toughness in a certain degree.

That is, since Ti(C,N) had a micro fine structure in comparison with TiC, toughness thereof had been improved, in addition to a chemical stability and a mechanical shock resistance.

Meanwhile, to improve toughness, various additive carbides such as WC, $Mo_2C$, TaC, NbC, etc. Have been used, and even now products in the form of Ti(C,N)-M1C-M2C—. . . —Ni/Co are commercializing.

When adapting the additive carbides for the improvement of toughness, a general microstructure of TiC based or Ti(C, N) based cermet sinter is observed as a core/rim structure of hard phase, around which Ni, Co, etc. of binding phase surround.

The core of the structure is undissolved TiC or Ti(C,N) in liquefied metal binder (Ni, Co and so on) during sintering, the core having a structure with high hardness.

On the contrary, a structure of rim surrounding the core is a solid-solution of TiC or Ti(CN), which is the component of the core, and the carbides, which are the additives [the solid-solution is expressed as (Ti,M1,M2 . . . )(C,N)].

The structure of rim has high toughness rather than hardness. Therefore, in order to resolve the fatal weakness of toughness that simple cermet such as TiC or Ti(C,N)—Ni has, the structure of rim has been provided in the cermet.

However, the cermet having such core/rim structure still has a problem in that the cermet has toughness lower than that of WC—Co hard alloy, so that the cermet cannot yet replace WC—Co completely.

Further, the strain developed at the interface between core and rim phases exerts a negative effect on the properties, facilitating crack propagation through the interface during machining. Thus, there have been enormous efforts to produce homogeneous solid-solutions of single phase without core/rim structure in order to secure the application area of the cermet as broad as WC—Co. However, many industrial attempts targeting this homogeneity have failed to provide it.

SUMMARY OF THE INVENTION

Accordingly, the present invention has been made to solve the above-mentioned problems occurring in the prior art.

The object of the present invention is to provide a solid-solution powder, a method for preparing the solid-solution powder, a cermet powder including the solid-solution powder, a method for preparing the cermet powder, a cermet using the cermet powder and a method to prepare the cermet, in which the problem of low toughness due to high hardness that conventional cermets (especially TiC or Ti(CN) based cermet) have is resolved because a complete solid-solution phase without core/rim structure is provided to the cermets as a microstructure thereof, and in which further increased the hardness as well as the toughness, thereby substantially and considerably increasing general mechanical properties of materials using the cermet, and thus substituting WC—Co Hard material and allowing manufacturing of cutting tools with high hardness and toughness.

In order to achieve the object, according to the present invention, there is provided a solid-solution powder comprising a carbide, a carbo-nitrite or mixture thereof of at least two elements of metals selected, including Ti, from IVa, Va and VIa Group metals of periodic table, the solid-solution powder having nano-sized crystallites of 50 nm or less, the microstructure of the solid-solution powder being a complete solid-solution phase.

Further, according to the present invention, there is provided a cermet powder being an agglomerate comprising (i) a carbide, a carbo-nitrite or mixture thereof of at least one element of metals selected from IVa, Va and VIa Group metals of periodic table, and (ii) at least one element of metals selected from Ni, Co And Fe, the agglomerate having nano-sized crystallites of 50 nm or less.

In the cermet powder according to the present invention, the cermet powder is an agglomerate comprising (i) a carbide, a carbo-nitrite or mixture thereof of at least two elements of metals selected, including Ti, from IVa, Va and VIa Group metals of periodic table, and (ii) at least one element of metals selected from Ni, Co And Fe, the agglomerate having complete solid-solution and nano-sized crystallites of 50 nm or less.

Further, according to the present invention, there is provided a cermet being a sinter of the cermet powder which is an agglomerate comprising (i) a carbide, a carbo-nitrite or mixture thereof of at least one element of metals selected from IVa, Va and VIa Group metals of periodic table, and (ii) at least one element of metals selected from Ni, Co And Fe, the agglomerate having nano-sized crystallites of 50 nm or less.

In the cermet according to the present invention, the cermet powder is an agglomerate comprising (i) a carbide, a carbo-nitrite or mixture thereof of at least two elements of metals selected, including Ti, from IVa, Va and VIa Group metals of periodic table, and (ii) at least one element of metals selected from Ni, Co And Fe, the agglomerate having complete solid-solution and nano-sized crystallites of 50 nm or less.

In the cermet according to the present invention, the cermet is a sinter of the mixture of the cermet powder of Ti(CN)-Me having nano-sized crystallites of 50 nm or less (Me is a binding phase, which is one or more selected from the group consisting of Ni, Co, Fe) and the cermet powder of one or more selected from the group consisting of WC-Me, $Mo_2C$-Me, TaC-Me, NbC-Me, all of which have nano-sized crystallites of 50 nm or less (Me is a binding phase, which is one or more selected from the group consisting of Ni, Co, Fe), and the sinter has core of Ti(CN).

In the cermet according to the present invention, the cermet is a sinter of the mixture of the cermet powder of Ti(CN)-Me having nano-sized crystallites of 50 nm or less (Me is a binding phase, which is one or more selected from the group consisting of Ni, Co, Fe) and the cermet powder which is an agglomerate comprising (i) a carbide, a carbo-nitrite or mixture thereof of at least two elements of metals selected, including Ti, from IVa, Va and VIa Group metals of periodic table, and (ii) at least one element of metals selected from Ni, Co And Fe, the agglomerate having complete solid-solution and nano-sized crystallites of 50 nm or less.

In the cermet according to the present invention, the cermet further comprises a hard phase of TiC, Ti(CN), $(Ti,M_1,M_2...)C$ or $(Ti,M_1,M_2...)(CN)$ only on the surface of the cermet, the hard phase being formed with sintering the cermet powder under the control of amount and/or time of introducing nitrogen to a furnace during the sintering.

In the cermet according to the present invention, the cermet further comprises a hard coating layer of TiC, TiN, Ti(CN), TiAlN or TiAlCrN on the surface of the cermet, the hard coating layer being formed with CVD or PVD method after sintering the cermet powder.

Further, according to the present invention, there is provided a method for preparing a solid-solution powder, comprising the steps of: mixing oxides having nano size of at least two elements of metals selected, including Ti, from IVa, Va and VIa Group metals of periodic table with carbon powders, in a predetermined composition (S1-1); and reducing and carburizing the mixed powders of the oxides and the carbon powders (S2).

In the method according to the present invention, the step (S1-1) further comprises grinding the mixed powders of the oxides and the carbon powders.

Further, according to the present invention, there is provided a method for preparing a solid-solution powder, comprising the steps of: mixing oxides having micron size of at least two elements of metals selected, including Ti, from IVa, Va and VIa Group metals of periodic table with carbon powders, in a predetermined composition, and grinding the mixed powders of the oxides and the carbon powders to nano size or amorphous state (S1-2); and reducing and carburizing the mixed powders of the oxides and the carbon powders (S2).

Further, according to the present invention, there is provided a method for preparing cermet powder, the method comprising the steps of: mixing (i) oxides having nano size of at least one element of metals selected from Ni, Co And Fe, (ii) oxides having nano size of at least one element of metals selected from IVa, Va and VIa Group metals of periodic table, and (iii) carbon powders, in a predetermined composition (S1-3); and reducing and carburizing the mixed powders of the oxides [(i) and (ii)] and the carbon powders (iii) (S2).

In the method according to the present invention, the step of (S1-3) comprises mixing (i) oxides having nano size of at least one element of metals selected from Ni, Co And Fe, (ii) oxides having nano size of at least two elements of metals selected, including Ti, from IVa, Va and VIa Group metals of periodic table, and (iii) carbon powders, in a predetermined composition.

In the method according to the present invention, the step (S1-3) further comprises grinding the mixed powders of the oxides [(i) and (ii)] and the carbon powders (iii).

Further, according to the present invention, there is provided a method for preparing cermet powder, the method comprising the steps of: mixing (i) oxides having micron size of at least one element of metals selected from Ni, Co And Fe, (ii) oxides having micron size of at least one element of metals selected from IVa, Va and VIa Group metals of periodic table, and (iii) carbon powders, in a predetermined composition, and grinding the mixed powders of the oxides [(i) and (ii)] and the carbon powders (iii) to nano size or amorphous state (S1-4); and reducing and carburizing the mixed powders of the oxides [(i) and (ii)] and the carbon powders (iii) (S2).

In the method according to the present invention, the step of (S 1-4) comprises mixing (i) oxides having micron size of at least one element of metals selected from Ni, Co And Fe, (ii) oxides having micron size of at least two elements of metals selected, including Ti, from IVa, Va and VIa Group metals of periodic table, and (iii) carbon powders, in a predetermined composition, and grinding the mixed powders of the oxides [(i) and (ii)] and the carbon powders (iii) to nano size or amorphous state.

In the methods according to the present invention, the step (S2) further comprises nitriding the mixed powders of the oxides and the carbon powders in addition to the reducing and carburizing.

In the methods according to the present invention, the step (S2) is preformed so that the reducing and carburizing are conducted at a temperature of 1000 to 1300° C. for 3 hours or less under a vacuum or hydrogen, $CH_4$, $CO/CO_2$ atmosphere, and then the nitriding is conducted under a nitrogen atmosphere.

Further, according to the present invention, there is provided a method for preparing a cermet, the method comprising the step of: sintering a cermet powder which is an agglomerate comprising (i) a carbide, a carbo-nitrite or mixture thereof of at least one element of metals selected from IVa, Va and VIa Group metals of periodic table, and (ii) at least one element of metals selected from Ni, Co And Fe, the agglomerate having nano-sized crystallites of 50 nm or less.

In the method according to the present invention, sintered is the mixture of the cermet powder of Ti(CN)-Me having nano-sized crystallites of 50 nm or less (Me is a binding phase, which is one or more selected from the group consisting of Ni, Co, Fe) and the cermet powder of one or more selected from the group consisting of WC-Me, Mo$_2$C-Me, TaC-Me, NbC-Me, all of which have nano-sized crystallites of 50 nm or less (Me is a binding phase, which is one or more selected from the group consisting of Ni, Co, Fe).

In the method according to the present invention, sintered is the mixture of the cermet powder of Ti(CN)-Me having nano-sized crystallites of 50 nm or less (Me is a binding phase, which is one or more selected from the group consisting of Ni, Co, Fe) and the cermet powder which is an agglomerate comprising (i) a carbide, a carbo-nitrite or mixture thereof of at least two elements of metals selected, including Ti, from IVa, Va and VIa Group metals of periodic table, and (ii) at least one element of metals selected from Ni, Co And Fe, the agglomerate having a complete solid-solution and nano-sized crystallites of 50 nm or less.

In the method according to the present invention, the method further comprises the process of forming a hard phase of TiC, Ti(CN), (Ti,M$_1$,M$_2$ . . .)C or (Ti,M$_1$,M$_2$ . . .)(CN) only on the surface of the cermet with sintering the cermet powder under the control of amount and/or time of introducing nitrogen to a furnace during the sintering.

In the method according to the present invention, the method further comprises the process of forming a hard coating layer of TiC, TiN, Ti(CN), TiAlN or TiAlCrN on the surface of the cermet with CVD or PVD method after sintering the cermet powder.

DETAILED DESCRIPTION OF THE INVENTION

Figure 1:
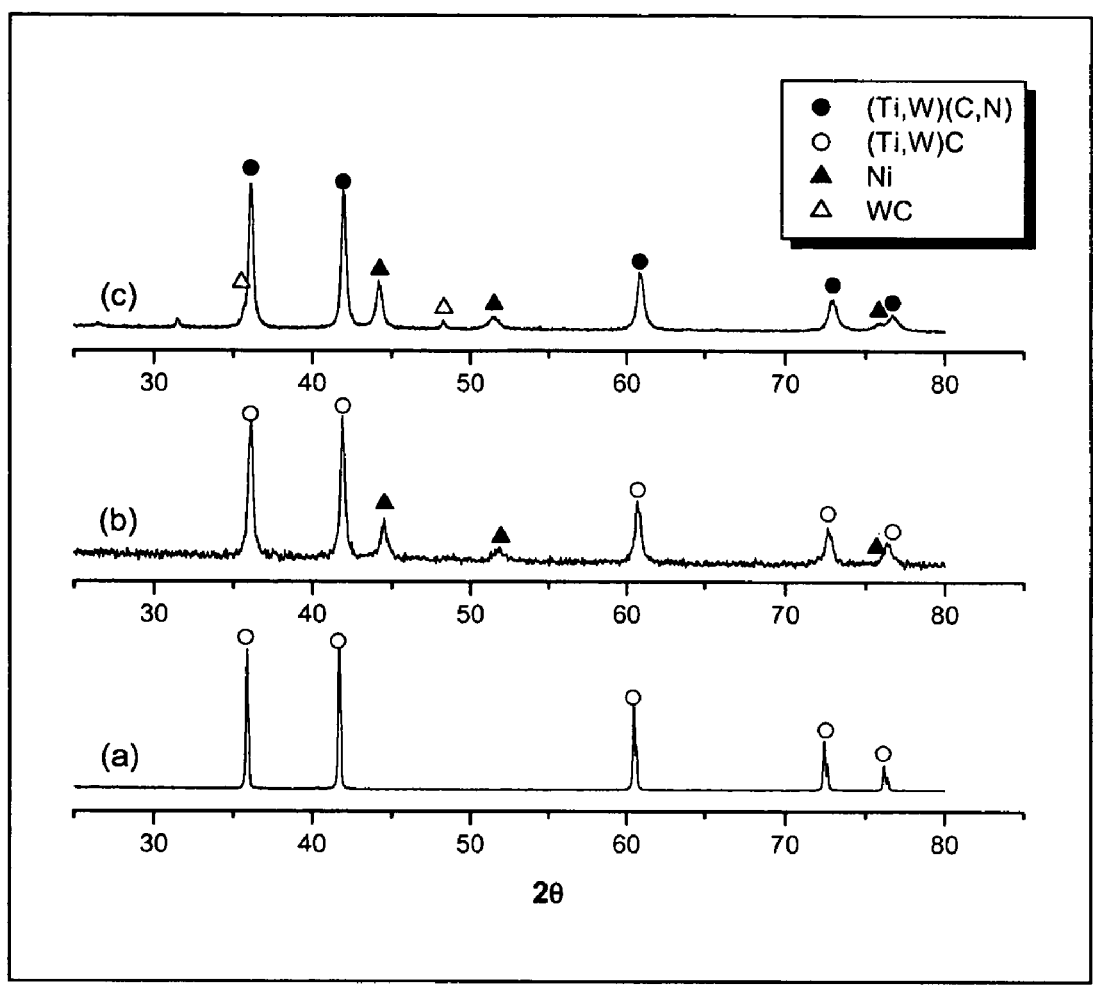
FIG. 1a shows a result of XRD phase analysis of (Ti,W)C solid-solution powders (containing 15 wt % of WC) according to the present invention.
FIG. 1b shows a result of XRD phase analysis of (Ti,W)C—Ni cermet powders (containing 30 wt % of WC) according to the present invention.
FIG. 1c shows a result of XRD phase analysis of (Ti,W)(C,N)—Ni cermet powders (containing 30 wt % of WC and C/N=3:1) according to the present invention.

In this context, the capital letter of W, M1, M2 . . . and the small letter of w, m$_1$, m$_2$ . . . Are used simultaneously. It is intended that the small letter of w, m1, m$_2$ . . . Are meant to show small amount of metal relatively in comparison of the capital letter W, M1, M2 . . . .

According to the present invention, the solid-solution powder or the cermet powder, which is an agglomerate, including a binding metal in addition to the solid-solution powder have nano-sized crystallites with a size of 50 nm or less, thus to possibly provide a complete solid-solution phase without a core/rim structure, which substantially and considerably increase a toughness of the cermet prepared.

According to the present invention, methods for preparing the solid-solution powder and the cermet powder comprise two steps respectively:

The primary step for preparing solid-solution powder includes mixing oxides having nano size of metals selected, including Ti, from IVa, Va, VIa Group elements of periodic table with carbon powders, or mixing and grinding the mixed powders, if necessary (S1- 1).

Otherwise, the primary step for preparing solid-solution powder includes mixing oxides having micron size of metals selected, including Ti, from IVa, Va, Via Group elements of periodic table with carbon powders, and grinding the mixed powders to nano size or amorphous state (S1-2).

In order to prepare carbide or carbo-nitrite solid-solution powder having a complete solid-solution phase, in the primary step, it is possible that available oxides or carbon powders having nano size are used. However, it is preferable that the mixed powders of the oxides and the carbon powders having micron sizes are ground to nano sizes or amorphous state by using a high energy ball milling (e.g. using a planetary mill or attrition mill).

That is, for example, in order to prepare TiC based solid-solution powder having nano size, performed may be mixing a nano-sized TiO$_2$, oxides having nano size of any one or at least two metals selected, excluding Ti, from IVa, Va and VIa Group metals of periodic table (for example WO$_3$) with carbon powders. Then, if necessary, further performed may be grinding the mixed powders of nano-sized oxides and carbon powders.

However, if not used metal oxides that have already been nano-sized before mixing and/or grinding, performed is mixing the micron-sized TiO$_2$, oxides having micron size of any one or at least two metals selected, excluding Ti, from IVa, Va and VIa Group metals of periodic table with carbon powders, and then performed is grinding the mixed powders to have nano size or amorphous state.

Herein, an amount of mixing can be properly selected according to a predetermined composition of solid-solution powder. Further, upon the grinding, a high energy ball milling as described above may be used. In the present invention, even only through the ball milling process, nano-sized crystallites or amorphous state are easily prepared.

Meanwhile, the primary step for preparing cermet powder includes mixing oxides having nano size of metals selected, preferably including Ti, from IVa, Va, VIa Group elements of periodic table and binder such as Ni, Co or Fe having nano size with carbon powders, or mixing and grinding the mixed powders, if necessary.

Otherwise, the primary step for preparing cermet powder includes oxides having micron size of metals selected, preferably including Ti, from IVa, Va, VIa Group elements of periodic table and binder such as Ni, Co or Fe having micron size with carbon powders, and grinding the mixed powders to nano size or amorphous state.

That is, in order to prepare cermet powder according to the present invention, performed is mixing binder metal in nano size such as Ni, Co, Fe or Ni/Co, etc.; and oxides having nano size of metals selected, preferably including Ti, from IVa, Va, VIa Group elements of periodic table; and carbon powders. If necessary, grinding is further conducted even in this case.

Herein, when used micron-sized binder metal such as Ni, Co, etc., performed is mixing oxides having nano or micron size of metal selected, preferably including Ti, from IVa, Va, VIa Group elements of periodic table and carbon powders with the micron-sized binding metal, and then performed is grinding the mixed powders to nano size or amorphous state.

According to the primary step, a homogeneous microstructure consisting of a complete solid-solution phase without a core/rim structure can be attained. Further, a cermet can be attained with a direct sintering of the cermet powder without additional mixing processes Next, the second step for preparing solid-solution powder and cermet powder includes reducing and carburizing. If necessary, the second step includes reducing, carburizing and nitriding (S2).

That is, after the mixed and/or ground powders are reduced under, for example, a vacuum, hydrogen, $CO/CO_2$ or $CH_4$ atmosphere, and then carburized (carburized and nitrided), solid-solution powder having nano crystallite and consisting of complete solid-solution phase are prepared. Also, in case of cermet powder, an agglormerate having nano crystallite and complete solid-solution is prepared.

Further, for example, upon the formation of carbo-nitrite, reducing and carburizing are conducted through an annealing for 3 hours or less at a temperature of 1000 to 1300° C. under a vacuum or hydrogen atmosphere, and then nitriding is conducted, so that minimum quantity of oxygen and proper quantity of carbon and nitrogen are secured to prevent the formation of voids and to improve the mechanical properties of the cermet.

The content of oxygen is an important factor in the carbide or cabo-nitrite nano powders prepared by above process. Generally, if the content of oxygen is increased, it is subject to form voids, so that it is necessary to secure minimum content of oxygen and a proper quantity of carbon in conformity with the oxygen content.

Accordingly, the mixed and/or ground powders are reduced at 1000 to 1300° C. under a vacuum or hydrogen atmosphere for 3 hours or less and are then carburized (carburized and nitrided), so that as shown in the following example, even nano powders, particularly in case of Ti(CN) based nano crystallites, have the oxygen content similar to that of normal micron-sized powders.

Under the processing condition, an amount of nitrogen can be freely selected according to a process temperature, a partial pressure of nitrogen upon composing of powders, and an amount of carbon added to the powders. Particularly, as a stable composition, C/N (mol ratio) is preferably 3/7, 5/5 or 7/3, more preferably 7/3.

Then, the cermet powders prepared are sintered with a temperature and time for sintering the cermet powders under a atmosphere such as vacuum atmosphere so that cermet such as TiC or Ti(CN) based cermet having complete solid-solution phase is attained.

According to the method of the present invention, there can be prepared complete solid-solution powders having a type of (Ti,M1,M2 . . . )C, (Ti,M1,M2 . . . )(C,N), (Ti,M1, M2 . . . )C—Ni and (Ti,M1,M2 . . . )(C,N)—Ni . . . . Further, the cermet powder including said solid-solution powder and a cermet using the cermet powder can be provided.

TiC or Ti(CN) based solid-solution powder prepared in the present invention become to have nano-sized crystallites of 50 nm or less, which provide the complete solid-solution phase. Further, cermet such as TiC or Ti(CN) based cermet powder prepared in the present invention become an agglomerate having nano-sized crystallites of 50 nm or less, which provide complete solid-solution phase.

The size of the powder and agglomerate can be regulated in various sizes. That is, by regulating milling condition such as time, speed, temperature, etc., powders composition condition such as time, temperature, etc., the size of the powders and agglomerates can be regulated. Further, the agglomerates can be prepared to have a submicron size (more than 100 nm, and less than 1 μm), and a micron size (a few μm).

However, since the manufacturing equipment and process of the cermet of prior art are optimized for powders having a size more than submicron, it is proper to prepare an agglomerates of 200 nm or less according to the present invention in light of easy approach and economical efficiency.

All metals that are solutes in the solid-solution powders of the present invention can form a complete solid-solution phase within the range of solid solubility of the respective metals.

That is, in the complete solid-solution powders of the present invention, for example, if WC is a solute therein, the solute amount thereof can be 15 wt %, 30 wt %, 60 wt % and more. Also, in case of other $Mo_2C$, NbC added carbide and so on, a complete solid-solution phase can be attained within the range of solid solubility of the respective metals.

In the present invention, for further improving the hardness of the cermet having a high toughness according to the present invention, two methods may be used during the sintering of the cermet powders according to the present invention.

One is a method to form a hard layer on a surface of the cermet and the other is a method to form a high hard coating on a surface of the cermet.

For forming the hard layer on a surface of the cermet, the amount, preferably the amount and time for introducing nitrogen to a furnace are controlled during the singtering of the cermet powders according to the present invention.

That is, during the sintering of the cermet powders according to the present invention, 1~100 torr of nitrogen is introduced to the furnace from before or during the sintering temperature, and the pressure can be made to be kept to a cooling process. To this end, solid-solution phase in the form of (Ti, W, M1, M2 . . . )C/ (Ti, W, M1, M2 . . . )CN are induced to be decomposed to TiC, Ti(CN), (Ti,w,$m_1$, $m_2$ . . . )C or (Ti, w, $m_1$,$m_2$ . . . ) (CN) of high hardness with/without WC, M1C, M2C, so that the high hard phase come to be formed as a hard layer only on the surface of the cermet and, therefore, the whole cermet sinter becomes to keep its high toughness, and have high hardness.

Further, for forming a high hard coating on a surface of the cermet, a high hard coating layer of TiC, TiN, Ti(CN), TiAlN, TiAlCrN, etc. Are made to be formed on the surface of the cermet by using the CVD, PVD, etc. method after sintering the cermet powder according to the present invention. Further, if necessary for controlling a lattice mismatch (decreasing the lattice mismatch), after the size of the solid-solution phase on the surface of the cermet is made to be lager (the cermet becomes to have extended size of solid-solution phase) or the binding phase of metal is made to be rich near on the surface of the cermet by using the atmosphere of vacuum or argon, nitrogen, etc. during the sintering of the cermet powders according to the present invention, then the high hard coating layer are made to be formed.

Further to using the above-mentioned methods or without using the methods, in the present invention, ultra fine or nano size cermet of high toughness having high hardness wholly can be prepared by the following two methods.

One is a method that nano crystallite powder of Ti(CN)-Me, WC-Me, Mo$_2$C-Me, TaC-Me, NbC-Me (Me is a binding phase, which is one or more selected from the group consisting of Ni, Co, Fe) according to the present invention are mixed in a predetermined amount, and are sintered so that the sinter having core of fine Ti(CN) is prepared.

The other method is that nano crystallite powder of Ti(CN)-Me (Me is a binding phase, which is one or more selected from the group consisting of Ni, Co, Fe) and the cermet powder of complete solids-solution according to the present invention are mixed in a predetermined amount, and are sintered so that the hardness of the cermet can be reinforced.

As described above, said two methods can be used with the method of forming the hard layer on a surface of the cermet or with the method of forming a high hard coating on a surface of the cermet.

Hereinafter, preferred embodiments of a method according to the present invention will be described in detail.

EXAMPLE 1

As an example, the anatase-TiO$_2$ of purity 99+%, NiO of purity 99% (avg. particle size of 45 μm) and WO$_3$ of purity 99+% (avg. particle size of 20 μm) were used.

They were mixed with carbon powder for the five target compositions as follows: (i) (Ti,W)C—Ni (containing 15 wt % of WC), (ii) (Ti,W)C—Ni (containing 30 wt % of WC), (iii) (Ti,W)(C,N)—Ni (containing 15 wt % of WC and C/N=2:1), (iv) (Ti,W)(C,N)—Ni (containing 30 wt % of WC and C/N=3:1), and (v) (Ti,W)C (containing 15 wt % of WC).

They were ground, i.e. high-energy ball milled using a planetary mill (Fritsch Pulverisette 7). Tungsten carbide (WC) balls with 5 mm in a diameter were used as milling media and mixed with powders at a ball-to-powder weight ratio of 20:1.

A tungsten carbide bowl was used and all milling was conducted at a speed of 250 RPM in air for 20 hours.

To this end, the ground nano powders were annealed at 1300° C. for one and half hours under a vacuum or hydrogen atmosphere to be reduced, and carburized. Herein, in case of carbo-nitrite, nitrogen was injected into a vacuum furnace to be nitrided.

FIG. 1 shows a result of XRD phase analysis of nano powders prepared by one example of the present invention.

In the drawings, FIG. 1a shows that a complete solid-solution powders of (Ti,W)C (containing 15 wt % of WC) have been prepared from a mixture of TiO$_2$, WO$_3$ and C, FIG. 1b shows that cermet powders having a complete solid-solution phase of (Ti,W)C—Ni (containing 30 wt % of WC) have been prepared from a mixture of TiO$_2$, WO$_3$, NiO and C, and FIG. 1c shows that cermet powders having a complete solid-solution phase of (Ti,W)(C,N)—Ni (containing 30 wt % of WC) have been prepared from a mixture of TiO$_2$, WO$_3$, NiO and C.

As shown in FIG. 1a, the solid-solution phase formed is a single phase, which cannot be formed in the prior art. FIGS. 1b and 1c also show that Ni nano powders have been existed in a shape of being mixed with a single solid-solution phase.

It is proved that a homogeneous microstructure has been attained through using nano sized Ni and nano sized carbide or carbo-nitrite. Also, from the above method, a cermet can be attained by a direct sintering without an additional mixing process in a preparing process of the cermet.

Figure 2A:
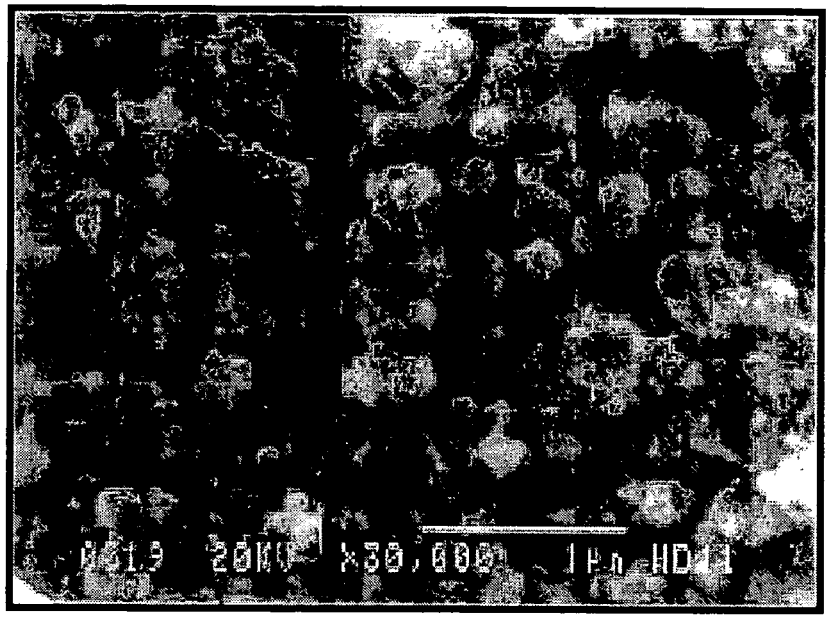
FIG. 2a is a photograph of SEM showing a shape of (Ti,W)C—Ni cermet powders (containing 15 wt % of WC) according to the present invention.
Figure 2B:
FIG. 2b is a photograph of TEM showing a shape of (Ti,W)C—Ni cermet powders (containing 15 wt % of WC) according to the present invention.

FIG. 2a is a photograph of SEM showing (Ti,W)C—Ni powders (containing 15 wt % of WC) prepared by one example of the present invention, and FIG. 2b is a photograph of TEM showing (Ti,W)C—Ni powders (containing 15 wt % of WC) prepared by one example of the present invention.

It is proved that, from FIG. 2a, the powders have been formed into a homogeneous agglomerates of approximately 200 nm in a given scale, and from FIG. 2b, the powders have been formed into a small mixed agglomerates having a size smaller than approximately 100 nm in a given scale.

This phenomenon of agglomerating is generally found in the nano powders, the formation of agglomerates contributes to a sintering besides an excessive agglomerating.

Table 1 is an analysis result of CNO element of the powders prepared on the basis of above compositions by the above process. As a comparison example, an analysis for commercial powders with the same composition was conducted.

TABLE 1

| | Compositions | C | N | O |
|---|---|---|---|---|
| 15 wt. % WC* | Nano (Ti,W)C—Ni* | 12.14 | 0.52 | 1.14 |
| | COMMERCIAL TiC—WC—Ni | 14.19 | 0.00 | 0.99 |
| 30 wt. % WC** | Nano (Ti,W)C—Ni** | 10.65 | 0.38 | 1.08 |
| | COMMERCIAL TiC—WC—Ni | 12.15 | 0.00 | 0.83 |
| 15 wt. % WC* | Nano (Ti,W)C—Ni* | 11.45 | 5.58 | 0.38 |
| | COMMERCIAL TiC—WC—Ni | 10.10 | 4.44 | 0.81 |
| 30 wt. % WC** | Nano (Ti,W)C—Ni** | 10.39 | 3.66 | 0.08 |
| | COMMERCIAL TiC—WC—Ni | 9.00 | 3.39 | 0.83 |

*The composition was made from Ti(CN)—15 wt. % WC—Ni as a starting composition.
**The composition was made from Ti(CN)—30 wt. % WC—Ni as a starting composition.

The composition was made from Ti(CN)-15 wt. % WC—Ni as a starting composition.

The xomposition was made from Ti(CN)-30 wt. % WC—Ni as a starting compositon.

As shown in Table 1, nano powders prepared is cermet powders of (Ti,W)C—Ni and (Ti,W)(C,N)—Ni with 15 and 30 wt % WC, and particularly, in case of (Ti,W)(C,N)—Ni, the oxygen content is lower than that of commercial powders.

The powders having the former compositions (i) to (iv) prepared like this by the above method of the present invention were sintered at a normal sintering temperature of 1510° C. for one hour under a vacuum atmosphere of 10$^{-2}$ Torr.

Figure 3A:
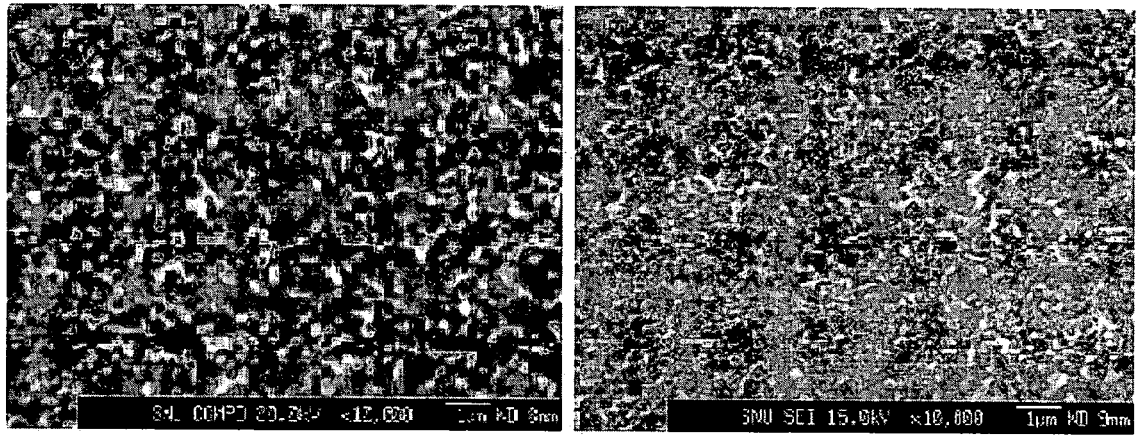
FIG. 3a are photographs of FE-SEM showing respective sinters (1510° C. and one hour) of (Ti,W)C—Ni cermet powders (containing 15 wt % of WC) and (Ti,W)C—Ni cermet powders (containing 30 wt % of WC) according to the present invention.

FIG. 3a shows photographs of a microstructure of the sintered specimens having the compositions (i) and (ii), in which the left photograph indicates a case of composition (i), and the right photograph indicates a case of composition (ii).

Figure 3B:
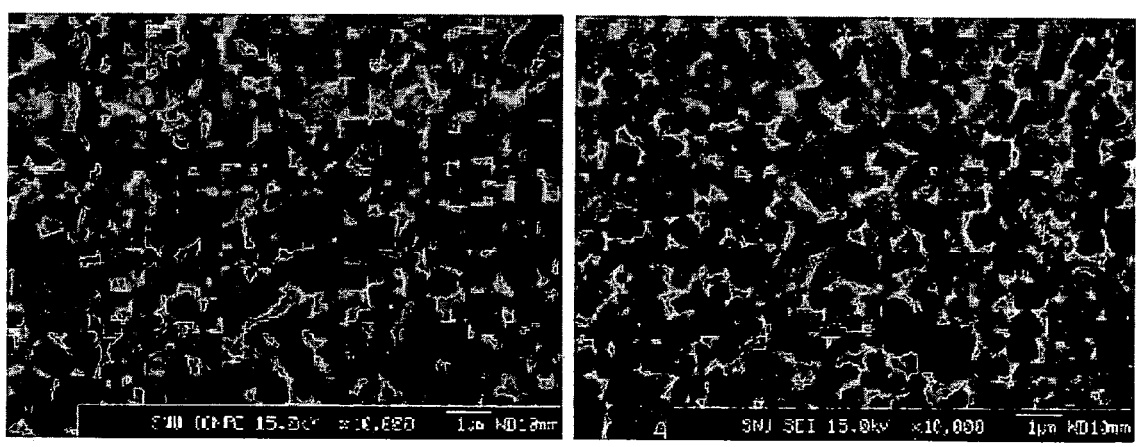
FIG. 3b are photographs of FE-SEM showing respective sinters (1510° C. and one hour) of (Ti,W)(C,N)—Ni cermet powders (containing 15 wt % of WC and C/N=2:1) and (Ti,W)(C,N)—Ni cermet powders (containing 30 wt % of WC and C/N=3:1) according to the present invention.

FIG. 3b shows photographs of a microstructure of the sintered specimens having the compositions (iii) and (iv), in which the left photograph indicates a case of composition (iii), and the right photograph indicates a case of composition (iv).

As shown in FIG. 3a, when sintered using (Ti,W)C—Ni solid-solution powders, a size of crystallite was of less than 50 nm, and as shown in FIG. 3b, in case of (Ti,W)(C,N)—Ni solid-solution powders, a microstructure was of a size of less than 1 µm.

As a result, it can be proved that a structure of a complete solid-solution phase is formed without being observed a core/rim structure in comparison with the conventional system of Ti(C,N)-M1C-M2C— . . . —Ni/Co And so on.

Table 2 shows mechanical properties of the cermet prepared by an example of the present invention. For comparison, an evaluation was conducted for a cermet fabricated by micron sized commercial powders with the same composition.

(Ti,W)C—Ni specimen (containing 15 wt % of WC) have been prepared from a mixture of $TiO_2$, $WO_3$, NiO and C and were exposed to nitrogen (~100 torr) atmosphere during sintering (1510° C. and one hour) until cooling process.

SEM/EDS analysis for the compositions of solid-solution phases on the surface and in the interior of the sintered cermet in nitrogen atmosphere are shown in Table 3.

TABLE 3

|  | interior | surface |
|---|---|---|
| Ti | 89.49 | 92.44 |
| W | 10.51 | 7.56 |
| Total | 100 at. % | 100 at. % |

TABLE 2

| Sintering condition | Composition | | | Compact density (g/cm³) | (%) | Sintering density (g/cm³) | (%) | Mechanical Characteristic | | Porosity |
|---|---|---|---|---|---|---|---|---|---|---|
| | | | | | | | | $H_V$ (GPa) | $K_{IC}$ (MPam$^{1/2}$) | |
| 1510° C. 1 hour | (Ti,W)C—Ni | | 15 wt. % WC | 3.97 | 63.6 | 6.13 | 100 | 12.3 | 13.2 | A2B1 |
| | | | 30 wt. % WC | 4.55 | 63.9 | 7.05 | 100 | 11.1 | 13.8 | A2B2 |
| | (Ti,W)(C,N)—Ni | | 15 wt. % WC | 3.58 | 57.3 | 6.16 | 98.8 | 12.2 | 12.8 | A3B1 |
| | | | 30 wt. % WC | 4.48 | 62.8 | 7.03 | 98.5 | 11.2 | 12.6 | A2B3 |
| 1400° C. 1 hour | (Ti,W)C—Ni | | 15 wt. % WC | 3.97 | 63.6 | 6.23 | 100 | 12.3 | 10.9 | A1B2 |
| | | | 30 wt. % WC | 4.55 | 63.8 | 7.08 | 100 | 11.2 | 11.7 | A1B2 |
| | (Ti,W)(C,N)—Ni | | 15 wt. % WC | 3.60 | 57.7 | 6.22 | 99.7 | 12.6 | 8.4 | A2B1 |
| | | | 30 wt. % WC | 4.49 | 62.9 | 7.01 | 98.1 | 11.5 | 11.5 | A2B2 |

As shown in Table 2, it could be seen that the cermet prepared had a high sintering density and a low porosity even in case of the simple composition of the cermet. Furthermore, a value of $K_{IC}$ in the cermet of the present invention was of a high toughness of 11~14 MPam$^{1/2}$ while that of the comparison example was of a toughness of 6~8 MPam$^{1/2}$. From this, it can be estimated that the cermet may become to be widely utilized comparing with that of the prior art.

EXAMPLE 2

As an example, a simple target composition has been firstly selected, and to this end, $TiO_2$, $WO_3$, NiO nano oxides having a 50 nm crystallite size according to the respective contents has been prepared.

As a target composition, two compositions were selected as follows: (i) (Ti,W)C—Ni (containing 15 wt % of WC) and (ii) (Ti,W)C—Ni (containing 30 wt % of WC).

Carbon powders and above nano oxides prepared were mixed and ground, and the ground nano powders were annealed at 1300° C. for two hours under a vacuum or hydrogen, $CH_4$, $CO/CO_2$ atmosphere to be reduced, and carburized.

During sintering of the cermet powders prepared, 1~100 torr of nitrogen is introduced to the furnace at the sintering temperature, and the pressure (1~100 torr) is made to be kept to a cooling process.

Figure 4A:
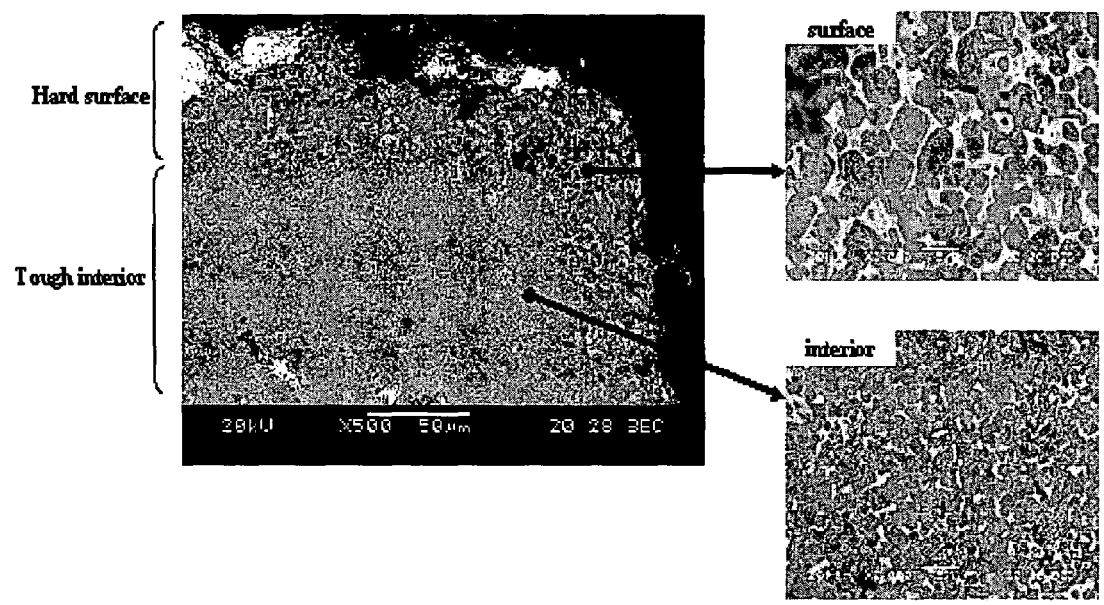
FIG. 4a are photographs of FE-SEM showing the sintered specimen (1510° C. and one hour) of (Ti,W)C—Ni cermet powder (containing 15 wt % of WC) in nitrogen atmosphere prepared by the present invention.

FIG. 4a are photographs of FE-SEM showing the sintered specimen (1510° C. and one hour) of (Ti,W)C—Ni cermet powder (containing 15 wt % of WC) in nitrogen atmosphere prepared by the present invention.

As FIG. 4a shows, a microstructure of the sintered specimen having two different complete solid-solution phases of (Ti,W)C—Ni at the surface and interior of the specimen.

As shown in Table 3, the solid-solution phases formed are different in the compositions. The solid-solution phase near the surface has higher amount of Ti than interior, which enhance the hardness of the surface layer. It is known that the hardness of TiC/Ti(CN) based solid-solution increases with Ti amount in the solid-solutions. FIG. 4a shows the growth of the surface solid-solution along with an increase of the metal binders near the surface.

Figure 4B:
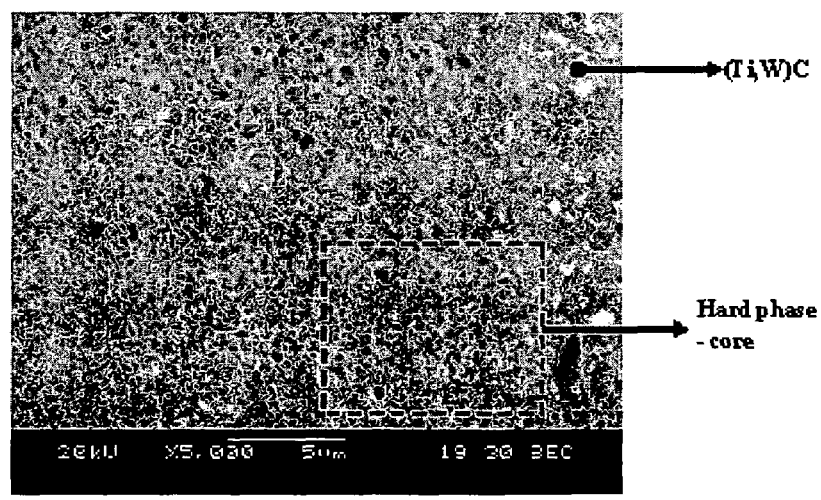
FIG. 4b is a photograph of FE-SEM showing the surface of the sintered specimen (1200° C. and one hour) of (Ti,W)C—Ni cermet powder (containing 30 wt % of WC) in nitrogen atmosphere prepared by the present invention.

Meanwhile, FIG. 4b is a photograph of FE-SEM showing the surface of the sintered specimen (1510° C. and one hour) of (Ti,W)C—Ni cermet powder (containing 30 wt % of WC) in nitrogen atmosphere prepared by the present invention.

As FIG. 4b shows, a microstructure of surface of the sintered specimen show the generation of very hard phase of TiC [or Ti(CN)], which has black color.

Therefore, it is proved that a harder surface microstructure has been attained through using nitrogen atmosphere from before or during sintering. This condition can be extended to cooling process.

EXAMPLE 3

As an example, a simple target composition has been firstly selected, and to this end, $TiO_2$, $WO_3$, NiO nano oxides having a 50 nm crystallite size according to the respective contents has been prepared.

As a target composition, four compositions were selected as follows: (i) (Ti,W)C—Ni (containing 15 wt % of WC), (ii) (Ti,W)C—Ni (containing 30 wt % of WC), (iii) (Ti,W)CN—Ni (containing 15 wt % of WC) and (iv) (Ti,W)CN—Ni (containing 30 wt % of WC).

Carbon powders and above nano oxides prepared were mixed and ground, and the ground nano powders were annealed at 1300° C. for two hours under a vacuum or hydrogen, $CH_4$, $CO/CO_2$ atmosphere to be reduced, and carburized. In case of carbo-nitrite, nitrogen was injected into a vacuum furnace.

During sintering of the cermet powders prepared, vacuum atmosphere (or argon, nitrogen) is used. Further, coating layer of TiN is formed on the surface of the cermet sintered by using PVD method. The coating layer of TiN show characteristics of high hardness and wear-resistance, so that forming the coating layer of TiN on the surface of the cermet gives great improvement in the hardness of the cermet.

Figure 5:
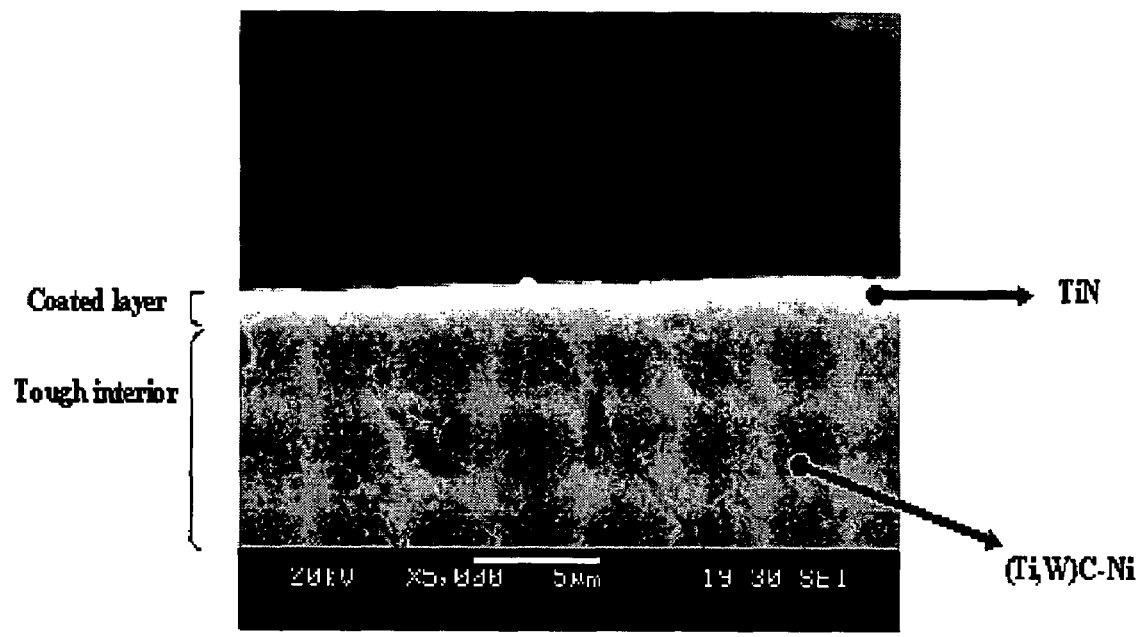
FIG. 5 is a photograph of FE-SEM showing sinter (1510° C. and one hour) of (Ti,W)C—Ni cermet powders (containing 15 wt % of WC), the surface of which is coated with TiN hard coating layer by PVD according to the present invention.

FIG. 5 is a photograph of FE-SEM showing sinter (1510° C. and one hour) of (Ti,W)C—Ni cermet powders (containing 15 wt % of WC), the surface of which is coated with TiN hard coating layer by PVD according to the present invention.

As shown in the FIG. 5, the coating layer was formed on the surface of the cermet. The thickness of the layer was 1-1.5 micron.

The mechanical characteristics of respective sinters according to the present invention are shown in Table 4.

TABLE 4

| Condition | Composition | | Interior | | TiN coated layer | |
|---|---|---|---|---|---|---|
| | | | Hardness (Gpa) | Toughness ($MPa \cdot m^{1/2}$) | Hardness (Gpa) | Toughness ($MPa \cdot m^{1/2}$) |
| Nano | (Ti,W)C—Ni | 15 WC | 12.3 | 13.2 | 14.3 | 8.8 |
| 1510° C. | | 30 WC | 11.1 | 13.8 | 14.1 | 8.8 |
| 1 h | (Ti,W)CN—Ni | 15 WC | 12.2 | 12.0 | 15.3 | 10.2 |
| | | 30 WC | 11.2 | 12.6 | 14.8 | 9.3 |

As shown in Table 4, although the coated layer has lower toughness than that of interior phase, the coated layer shows higher hardness than that of interior phase. Therefore, it came to our knowledge that the coated layer on the surface of the cermet gives high hardness to the cermet which has also high toughness wholly (interior+coated layer), thus providing the suitability of the cermet for cutting tools.

EXAMPLE 4

As an example, at first, nano powder of Ti(CN)—Ni, WC—Ni and $Mo_2C$—Ni were selected as a target composition for mixing, and to this end, ($TiO_2$, NiO), ($WO_3$, NiO) and ($Mo_2$, NiO) nano oxides having a 50 nm crystallite size according to the respective contents has been prepared.

As described above, the following three compositions were selected: (i) Ti(CN)—Ni (containing 20 wt % of Ni, C/N=7:3), (ii) WC—Ni (containing 20 wt % of Ni) and (iii) $MO_2C$—Ni (containing 20 wt % of Ni).

Carbon powders and above nano oxides prepared were mixed and ground, and the ground nano powders were annealed at 1300° C. for two hours under a vacuum or hydrogen, $CH_4$, $CO/CO_2$ atmosphere to be reduced, and carburized. In case of carbo-nitrite, nitrogen was injected into a vacuum furnace.

The three nano powders prepared in the above method was mixed for two target compositions as follows: (i) Ti(CN)—Ni+WC—Ni (containing 15 wt % of WC—Ni) and (ii) Ti(CN)—Ni +$MO_2C$—Ni (containing 15 wt % of $MO_2C$—Ni).

Figure 6A:
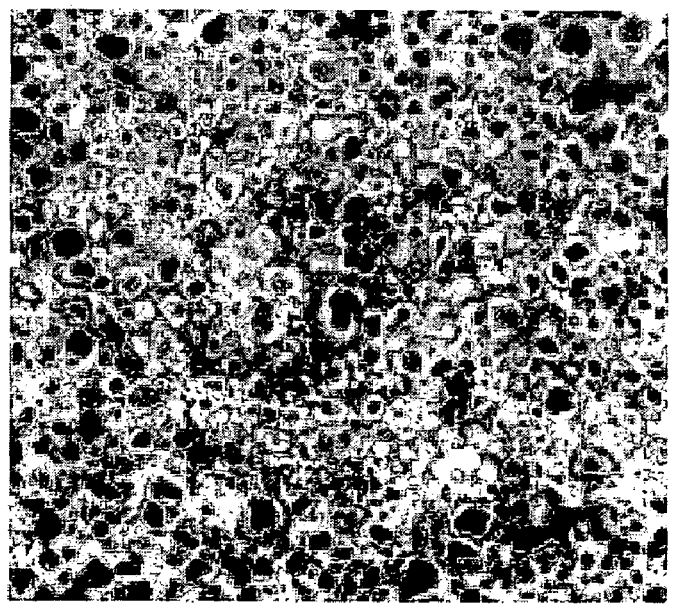
FIG. 6a is photograph of FE-SEM showing sinter (1510° C. and one hour) of cermet powders mixture of TiC—Ni and WC—Ni according to the present invention.
Figure 6B:
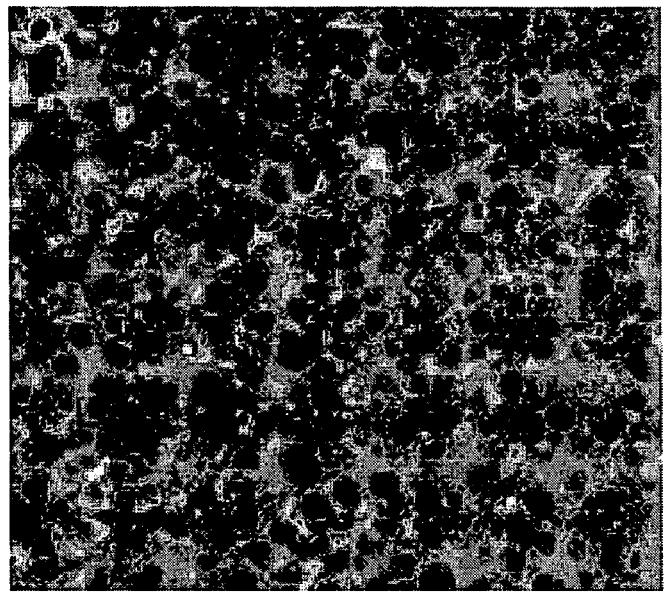
FIG. 6b is photograph of FE-SEM showing sinter (1510° C. and one hour) of cermet powders mixture of Ti(CN)—Ni and Mo$_2$C—Ni according to the present invention.

FIG. 6a is photograph of FE-SEM (bar scale: 5 μm) showing sinter (1510° C. and one hour) of cermet powders mixture of TiC—Ni and WC—Ni according to the present invention. FIG. 6b is photograph of FE-SEM (bar scale: 5 μm) showing sinter (1510° C. and one hour) of cermet powders mixture of Ti(CN)—Ni and $MO_2C$—Ni according to the present invention.

As FIGS. 6a and 6b shows, sinters of mixture of carbide and cabo-nitrite especially containing Ni were obtained. According to this method, reinforcermet of hardness and change of composition become to be easy.

EXAMPLE 5

As an example, for preparing solid-solution powder and Ti(CN)—Ni, ($TiO_2$, $WO_3$, NiO) and ($TiO_2$, NiO) nano oxides having a 50 nm crystallite size according to the respective contents has been prepared.

As a target composition, two compositions were selected as follows: (i) (Ti,W)(CN)—Ni (containing 30 wt % of WC, containing 20 wt % of Ni) and (ii) Ti(CN)—Ni (containing 20 wt % of Ni, C/N=7:3).

Solid-solution powder of (Ti,W)(CN)—Ni prepared and powder of Ti(CN)—Ni, were mixed for a composition (30 wt % Ti(CN)—Ni), and were sintered.

Figure 7:
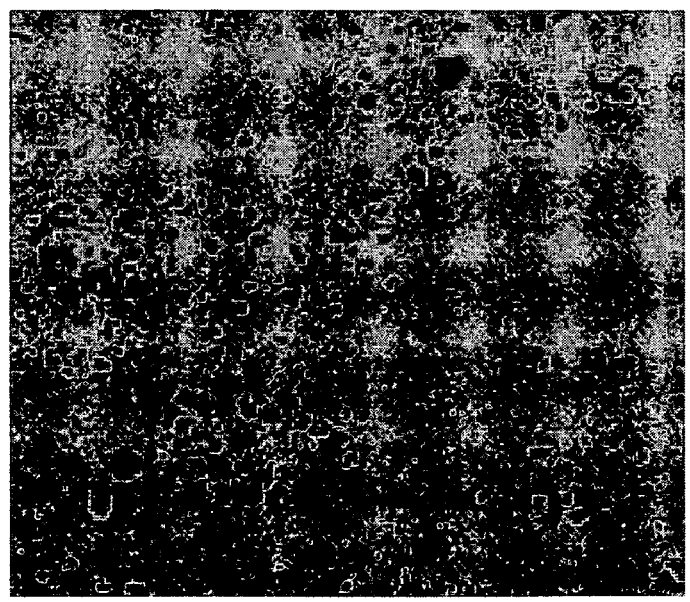
FIG. 7 is photograph of FE-SEM showing sinter (1510° C. and one hour) of cermet powders mixture of (Ti,W)(CN)—Ni and Ti(CN)—Ni (30 wt % Ti(CN)—Ni).

FIG. 7 is photograph of FE-SEM (bar scale: 5 μm) showing sinter (1510° C. and one hour) of cermet powders mixture of (Ti,W)(CN)—Ni and Ti(CN)—Ni (30 wt % Ti(CN)—Ni).

As FIG. 7 shows, sinter of mixture of solid-solution powder and Ti(CN)—Ni were obtained. According to this method, reinforcermet of hardness also becomes to be easy.

As described above, a solid-solution powder, a method for preparing the solid-solution powder, a cermet powder including the solid-solution powder, a method for preparing the cermet powder, a cermet using the cermet powder and a method to prepare the cermet according to the present invention can resolve a problem that the cermet such as TiC or Ti(CN) based cermet of the prior art had a lower toughness due to its high hardness, and provide the further improvement of the hardness as well as the toughness, so that it can be properly used in cutting tools, die materials and so on substituting the conventional WC—Co From the foregoing, in a solid-solution powder, a method for preparing the solid-solution powder, a cermet powder including the solid-solution powder, a method for preparing the cermet powder, a cermet using the cermet powder and a method to prepare the cermet according to the present invention, a complete solid-solution phase is provided to a microstructure of the solid-solution powder, especially TiC or Ti(CN) based solid-solution powder, considerably and substantially increasing a toughness of the cermet material, having an advantage in that a direct sintering can be conducted without additional mixing processes, and providing an effect of fabricating high hardness and toughness cutting tools to substitute WC—Co super hard material due to its excellent general mechanical properties.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for preparing a complete solid-solution powder, the method comprising the steps of:
    mixing nano size oxides of at least two metals selected from the group consisting of IVa, Va and VIa Group metals of periodic table with carbon powders (S1-1); and
    reducing and carburizing the mixed powders of the oxides and the carbon powders at a temperature of 1000 to 1300° C. for 3 hours or less (S2).

2. The method according to claim 1, wherein the step (S1-1) further comprises grinding the mixed powders of the oxides and the carbon powders.

3. The method according to claim 1, wherein the step (S2) further comprises nitriding the mixed powders of the oxides and the carbon powders in addition to the reducing and carburizing.

4. The method according to claim 3, wherein the step (S2) is preformed so that the reducing and carburizing are conducted at a temperature of 1000 to 1300° C. for 3 hours or less under a vacuum or hydrogen, $CH_4$, $CO/CO_2$ atmosphere, and then the nitriding is conducted under a nitrogen atmosphere.

5. A method for preparing a complete solid-solution powder, the method comprising the steps of:
    mixing micron size oxides of at least two metals selected, from the group consisting of IVa, Va and VIa Group metals of periodic table with carbon powders, and grinding the mixed powders of the oxides and the carbon powders to nano size or amorphous state (S1-2); and
    reducing and carburizing the mixed powders of the oxides and the carbon powders at a temperature of 1000 to 1300° C. for 3 hours or less (S2).

6. The method according to claim 5, wherein the step (S2) further comprises nitriding the mixed powders of the oxides and the carbon powders in addition to the reducing and carburizing.

7. The method according to claim 6, wherein the step (S2) is preformed so that the reducing and carburizing are conducted at a temperature of 1000 to 1300° C. for 3 hours or less under a vacuum, hydrogen, $CH_4$, $CO/CO_2$ atmosphere, and then the nitriding is conducted under a nitrogen atmosphere.

8. A method for preparing a cermet powder which is an agglomerate having a complete solid-solution carbide, the method comprising the steps of:
    mixing (i) nano size oxides of at least one metal selected from Ni, Co and Fe, (ii) nano size oxides of at least two metals selected from IVa, Va and VIa Group metals of periodic table, and (iii) carbon powders, (S1-3); and
    reducing and carburizing the mixed powders of the oxides and the carbon powders (iii) at a temperature of 1000 to 1300° C. for 3 hours or less (S2).

9. The method according to claim 8, wherein the step of (S1-3) comprises mixing (i) nano size oxides of at least one element of metals selected from Ni, Co and Fe, (ii) nano size oxides of Ti and at least one further metal selected, from IVa, Va and VIa Group metals of periodic table, and (iii) carbon powders.

10. The method according to claim 8, wherein the step (S1-3) further comprises grinding the mixed powders of the oxides and the carbon powders (iii).

11. The method according to claim 8, wherein the step (S2) further comprises nitriding the mixed powders of the oxides and the carbon powders (iii) in addition to the reducing and carburizing and the agglomerate contains complete solid-solution carbo-nitride.

12. The method according to claim 11, wherein the step (S2) is preformed so that the reducing and carburizing are conducted at a temperature of 1000 to 1300° C. for 3 hours or less under a vacuum or hydrogen, $CF_4$, $CO/CO_2$ atmosphere, and then the nitriding is conducted under a nitrogen atmosphere.

13. A method for preparing a cermet powder which is an agglomerate having complete solid-solution carbide, the method comprisinq the steps of:
    mixing (i) micron size oxides having of at least one metal selected from Ni, Co and Fe, (ii) micron size oxides having of at least two metals selected from IVa, Va and VIa Group metals of periodic table, and (iii) carbon powders, and grinding the mixed powders of the oxides and the carbon powders (iii) to nano size or amorphous state (S1-4); and
    reducing and carburizing the mixed powders of the oxides and the carbon powders (iii) at a temperature of 1000 to 1300° C. for 3 hours or less (S2).

14. The method according to claim 13, wherein the step of (S1-4) comprises mixing (i) micron size oxides of at least one element of metals selected from Ni, Co and Fe, (ii) oxides having micron size of Ti and at least one further metal selected from IVa, Va and VIa Group metals of the periodic table, and (iii) carbon powders, and grinding the mixed powders of the oxides and the carbon powders (iii) to nano size or amorphous state.

15. The method according to claim 13, wherein the step (S2) further comprises nitriding the mixed powders of the oxides and the carbon powders (iii) in addition to the reducing and carburizing and the agglomerate has complete solid-solution carbo-nitride.

16. The method according to claim 15, wherein the step (S2) is preformed so that the reducing and carburizing are conducted at a temperature of 1000 to 1300° C. for 3 hours or less under a vacuum or hydrogen, $CH_4$, $CO/CO_2$ atmosphere, and then the nitriding is conducted under a nitrogen atmosphere.

17. A method for preparing a cermet, the method comprising the step of:
    sintering a cermet powder which is an agglomerate comprising (i) a carbide, a carbonit ride or mixture thereof of at least two metals selected from IVa, Va and VIa Group metals of periodic table, and (ii) at least one metal selected from Ni, Co and Fe, the agglomerate having complete solid solution carbide or carbo-nitride and having nano-sized crystallites of 50 nm or less.

18. The method according to claim 17, wherein the method further comprises the process of forming a hard phase of TiC, Ti(CN), (Ti, $M_1$, $M_2$...) C or (Ti, $M_1M_2$...) (CN) only on the surface of the cermet with sintering the cermet powder under the control of amount and/or time of introducing nitrogen to a furnace during the sintering.

19. The method according to claim 17, wherein the method further comprises the process of forming a hard coating layer of TiC, TiN, Ti(CN), TiAlN or TiAlCrN on the surface of the cermet with CVD or PVD method after sintering the cermet powder.

20. The method according to claim 1 wherein in the step S1-1, nano size oxides of Ti and at least one further metal selected from IVa, Va and Via Group metals of the periodic table are mixed with carbon powders.

21. The method according to claim 5, wherein in the step S1-2, micron size oxides of Ti and at least one further metal selected from IVa, Va and VIa Group metals of periodic table are mixed with carbon powders.

22. The method according to claim 17, wherein the agglomerate comprises (i) a carbide, a carbo-nitride or mixture thereof of Ti and at least one further metal selected from IVa, Va and VIa Group metals of periodic table, and (ii) at least one metal selected from Ni, Co and Fe.

* * * * *